Aug. 29, 1939.   F. M. VAN FLEET   2,171,486
SEALING WAX APPLICATOR
Filed May 25, 1938
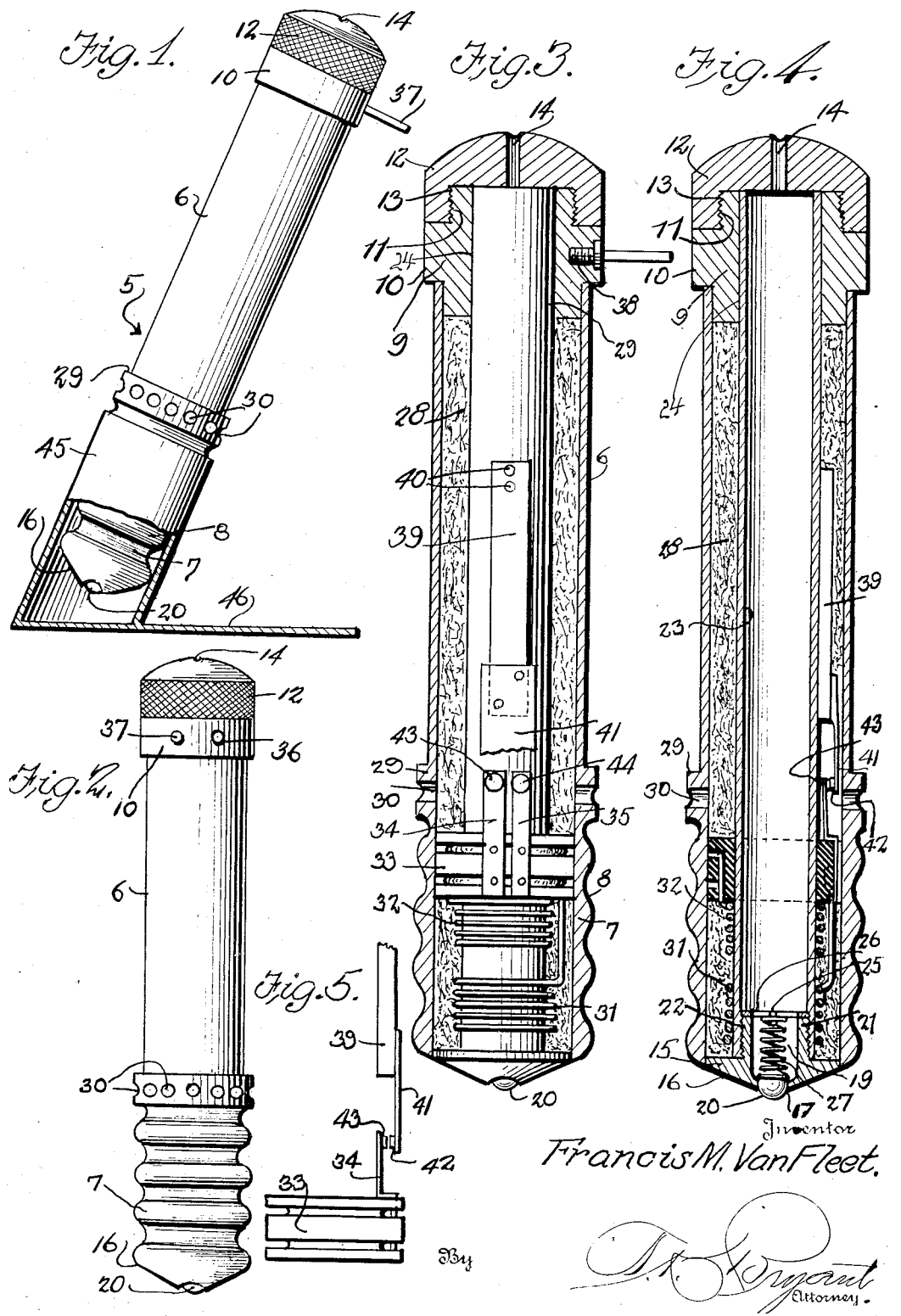

Patented Aug. 29, 1939

2,171,486

UNITED STATES PATENT OFFICE 2,171,486

SEALING WAX APPLICATOR

Francis M. Van Fleet, Elkhart, Ind.

Application May 25, 1938, Serial No. 210,023

2 Claims. (Cl. 219—21)

This invention relates to improvements in sealing wax applicators and more particularly of the self-heating type.

The primary object of this invention is to provide a sealing wax applicator of the above mentioned character including an elongated tube in which is mounted a concentric tube for holding a sufficient supply of wax capable of being heated by means of an electric heating element mounted in the lower portion of the elongated tube whereby the device may be continually used without the necessity of frequently re-heating the wax.

A further object of this invention is to provide a sealing wax applicator of the above mentioned character having a pair of electric heating elements which may be controlled thermostatically so that one of the heating elements may be cut off from the source of current after the wax has reached a predetermined degree of heat.

A still further object of this invention is to provide a sealing wax applicator of the above mentioned character, having a portion of the elongated casing provided on its lower outer wall with heat dissipating corrugations to prevent excessive heat in the handle portion of the casing.

A still further object of this invention is to provide a thermostat for controlling the heating unit in such a manner that the sealing wax after having reached a predetermined temperature will remain heated by the second heating element.

Other objects and advantages of the invention will become apparent during the course of the following description, taken with the drawing, wherein;

Figure 1 is a side elevational view of the device embodying this invention, illustrating the same supported in a table stand or cup;

Figure 2 is a side elevational view of the same showing the applicator removed from the support or stand;

Figure 3 is a vertical cross-sectional view illustrating the thermostatic switch in detail and showing the manner in which the heating elements are arranged in the lower end of the elongated casing;

Figure 4 is a vertical cross-sectional view of the same, taken at right angles to the sectional view of Figure 3; and Figure 5 is an enlarged fragmentary elevational view illustrating the thermostatic switch elements detached from the casing.

In the drawing, wherein for the purpose of illustrating the invention and wherein like reference characters will be employed to designate like parts throughout the same, the reference character 5 will generally be employed to designate an elongated tubular casing including a handle portion 6 and a lower heating chamber portion 7 provided with external heat dissipating corrugations 8. A plug 9 is fitted into the upper end of the handle portion 6 and is provided with an enlarged portion 10 threaded as at 11 for receiving a cap 12 having corresponding screw threads 13. A vent bore 14 is provided in the cap 12 to prevent a vacuum being formed in the sealing wax container which will be hereinafter fully described.

The lower portion of the elongated casing 5 is provided with a plug 15 having a conical wall 16 terminating in an opening 17 communicating with a valve chamber 19. A free floating valve of the ball type 20 is mounted in the valve chamber 19 and is adapted to seat within the opening 17 communicating therewith.

The valve chamber 19 is formed in a threaded nipple 21 having external threads 22 for receiving the lower threaded end of a concentric tube 23 extending within the elongated casing member 5 and being spaced from the walls thereof, while the upper end of the elongated tubular member 23 is held in the plug 9 as at 24. A perforated disk 25 is mounted in the lower end of the elongated tubular member 23 and is provided with holes or openings 26 for allowing the passage of sealing wax contained in the elongated chamber 23. A coil spring 27 has one of its ends abutting the perforated disk 25 while the opposite end engages the ball valve 20 for normally urging the same toward its seat 17.

Suitable insulating material 28 may be interposed between the outer elongated casing 5 and the inner concentric tubular member 23 for the purpose of preventing heat from reaching the handle portion 6 which is separated from the corrugated heat dissipating portion 7 by means of an enlarged annular boss 29 having air circulation openings 30 adapted to prevent the passage of heat upwardly through the handle portion 6 from the heating chamber portion 7.

Surrounding the lower portion of the elongated concentric tube 23 are electric heating elements 31 and 32 which are adapted to heat the lower portion thereof for the purpose of melting the wax and allowing the same to flow through the valve chamber 19 when the ball valve 20 is released from its seat 17 against the tension of the spring 27 as when pressure is applied to the ball valve. Surrounding the elongated tubular sealing wax containing chamber 23 is an annular insulating block 33 to which is attached contact fingers 34 and 35 which may be connected one end of each of the heating coils 31 and 32 respectively. The other terminal of each of the heating coils 31 and 32 may be connected to a common plug prong by means of suitable wiring (not shown). The other terminal 37 is directly connected to the plug 9 as by means of a threaded connection 38 so that the casing 23 will form the return connection for the circuit. A thermostatic member 39 has one of its ends connected to the concentric elongated tubular member 23 by means of rivets or the like as at 40 so that the free end may flex under heat conditions to cause the contact plate 41 having contacts 42 to swing into and out of engagement with contacts 43 and 44 formed on the free end of the contact fingers 34 and 35 respectively. It is intended to arrange the contact fingers 34 and 35 in such a manner that the circuit will be broken through the contact 34 controlling the heating element 32 before the circuit is broken through the contact 44 controlling the heating coil 31. In this manner, the heating coil 31 may remain in circuit with the source of supply after the heating coil 32 has been cut out of the circuit, such as when the sealing wax in the lower portion of the concentric elongated tubular member 23 reaches a predetermined temperature.

When the device is not in use, it may be supported in a tubular stand 45 mounted on a base 46 as shown in Figure 1 and it will be noted that the annular boss 29 forms a stop and limits the downward movement of the sealing wax applicator within the tubular stand or support 45.

It is to be understood that the contact prongs 36 and 37 may accommodate a conventional type appliance plug connected with a suitable source of current whereby the heating coils 31 and 32 will be supplied with sufficient current to cause sealing wax contained in the concentric elongated tubular member 23 to reach a melting point temperature. After the wax has been heated to the predetermined degree, it may flow freely through the valve chamber 19 and may be applied to the desired objects by exerting pressure upon the point of the ball valve 20 thereby causing the unseating of the same from the seat 17.

It is to be understood that the form of the invention herewith shown and described is to be taken as a preferred embodiment of the same and that various changes in the shape, size and arrangement of parts may be resorted to without departing from the spirit of the invention or the scope of the subjoined claims.

I claim:

1. A sealing wax applicator of the character described, comprising an elongated tube having an upper handle portion and a lower heat chamber portion, a series of annular corrugations forming a heat dissipating surface on said heat chamber portion, a concentric tube mounted within and spaced from the elongated tube, heat insulating material mounted between the elongated tube and concentric tube, a pair of electric heating elements surrounding the lowermost portion of the concentric tube and being housed by the heat chamber portion of the elongated tube, heat responsive means for successively controlling the electric heating elements, means for controlling the flow of fluid from the concentric tube and a cap threaded on the upper end of the elongated tube for partially closing the concentric tube.

2. A sealing wax applicator of the character described comprising an elongated tube having an upper handle portion and a lower heat chamber, a series of annular corrugations forming a heat dissipating surface on said heat chamber portion, a concentric tube mounted within and spaced from the elongated tube, spacing plugs mounted at each end within the elongated tube for supporting the concentric tube, heat insulating material mounted between the elongated tube and concentric tube, a pair of electric heating elements mounted within the heat chamber portion and surrounding the lower end of the concentric tube, thermostatic means responsive to heat changes for successively controlling the electric heating elements and a ball valve mounted in the lowermost plug adapted to be unseated when pressure is applied thereto by contacting a surface for controlling the flow of fluid from the concentric tube.

FRANCIS M. VAN FLEET.